Oct. 29, 1968    E. BASKIR    3,407,508
DOWNHOLE DETECTOR FOR DETERMINING MAGNETIC NORTH
Filed Aug. 13, 1965    3 Sheets-Sheet 1

INVENTOR:
E. BASKIR
BY:
HIS ATTORNEY

Oct. 29, 1968   E. BASKIR   3,407,508
DOWNHOLE DETECTOR FOR DETERMINING MAGNETIC NORTH
Filed Aug. 13, 1965   3 Sheets-Sheet 2

INVENTOR:
E. BASKIR
BY: *Theodore E. Bisher*
HIS ATTORNEY

Oct. 29, 1968          E. BASKIR          3,407,508

DOWNHOLE DETECTOR FOR DETERMINING MAGNETIC NORTH

Filed Aug. 13, 1965          3 Sheets-Sheet 3

INVENTOR:
E. BASKIR
BY:
HIS ATTORNEY

United States Patent Office 3,407,508
Patented Oct. 29, 1968

3,407,508
DOWNHOLE DETECTOR FOR DETERMINING MAGNETIC NORTH
Emanuel Baskir, Houston, Tex., assignor to Shell Oil Company, New York, N.Y., a corporation of Delaware
Filed Aug. 13, 1965, Ser. No. 479,568
2 Claims. (Cl. 33—204)

ABSTRACT OF THE DISCLOSURE

A sensing device for detecting the direction of the magnetic field of the earth in a borehole. The device uses two sensors whose sensitive axes are disposed at right angles and rotated as a unit about a vertical axis. The signal from one sensor is used to actuate a switching circuit to render the signal from the other sensor effective to actuate a control or indicating means when the sensitive axis of the other sensor is aligned with magnetic north.

---

This invention pertains to well drilling equipment and, more particularly, to a means for providing a known reference direction or orientation in a borehole. More specifically, the invention provides a means for producing an electrical signal or other indication when the sensitive axis of a device is aligned with or bears a known relation to the direction of the magnetic field of the earth.

In the course of drilling a borehole through the earth, it is frequently necessary to determine the orientation of a reference axis on the tool at the bottom of the borehole. For example, when cutting and retrieving cores, when setting a whipstock for directional drilling or when perforating pipe in a preferred direction, it is necessary to determine the orientation of a reference axis on the drilling string. Normally, it has been the practice to accomplish the orientation by noting the orientation of the drill string at the surface and assuming that the orientation was the same at the bottom. In cases where the drill string extends several thousand feet, surface observations are time consuming and very often inaccurate because of the uncertainty of the angular strain of the drill string.

To overcome the above difficulty and increase the operating ease, bottom hole directional detectors have been developed.

The known bottom hole orientation detectors are generally of three classes. The first makes use of the inertial properties of matter as, for example, a gyroscope or a doubly integrating accelerometer. The second general class uses information about the direction in which the axis of the hole deviates from the vertical—information which must be obtained by an auxiliary operation such as borehole surveying. The third general class uses the reference direction provided by the magnetic field of the earth. A device falling into the first of these classes has certain disadvantages; for example a gyroscope tends to drift and err in its direction indication unless reset periodically. When such a device is attached to an operating drill string that drift will be aggravated by the mechanical vibrations and high temperatures encountered in the drilling of a borehole. Thus inertial devices do not maintain their orientation for periods of sufficient duration to accomplish the above listed operations. A device falling into the second of these classes becomes increasingly less accurate the nearer the borehole is to the vertical, a condition usually encountered in practice. Furthermore, such a device does not provide a reliable indication of the orientation of a tool which is rotating. The tool must first be brought to rest.

Of the devices in the third general class, those dependent upon the reference direction provided by the magnetic field of the earth, the most common example is the mechanical magnetic compass in which a magnetized needle or bar is constrained in a suitable suspension to rotate about a pivot point and can rotate into an alignment with the magnetic field of the earth. It is obvious that the orientation of the mechanical magnetic compass will be seriously affected by vibration and rotation of its support. The mechanical magnetic compass can only provide a reliable reference direction when its support and the tool to which it is attached are at rest. There are other devices in the third general class which can provide an indication of orientation when the tool to which they are attached is rotating. For example the direction of the magnetic field of the earth relative to a reference direction in a drilling tool may be sensed indirectly by the electromotive force which the magnetic field induces in a conductive loop or coil rotating with the drilling tool. This method fails at the low and irregular rotational velocities encountered in drilling practice.

This invention solves the above problems by sensing the direction of the magnetic field of the earth directly by a device that is instantaneously responsive to the component of magnetization along a certain sensitive axis, for example a device which makes use of the Hall-effect or of a saturable ferromagnetic reactor.

The direct detection of the magnetic field of the earth by means of the use of a saturable ferromagnetic material as a saturable reactor in an electrical circuit has advantages over all other general methods and devices enumerated heretofore. These advantages include the relative independence of the sensitivity of such a reactor to the wide range of temperatures encountered in drilling a borehole, the mechanical ruggedness of such a reactor, the independence of the sensitivity of such a reactor to the conditions of motion and vibration encountered in drilling a borehole and the fact that it will respond directly to the magnetic field itself rather than to the time rate-of-change of that field. Therefore, a device constructed according to this invention, when fixed in a suitably non-magnetic housing, will provide an instantaneous and accurate indication of orientation regardless of the rotational velocity of that housing.

The detecting apparatus of this invention utilizes two saturable core reactors. The sensitive axis of the two reactors are disposed at 90 degrees to each other, and the two reactors are rotated in unison. A circuit is provided for passing the signal from one saturable core reactor only when its sensitive axis is aligned parallel with the magnetic north. When the sensitive axis is aligned toward the magnetic south the signal path is blocked; thus the detector transmits only a single signal or pulse that indicates when a reference direction in the body of the device coincides with the direction of magnetic north. The single pulse can then be used to perform various functions, as, for example, to actuate the device for marking a core that is being cut from the formation by the drill bit. Likewise, the pulse may be used to orient a whipstock that is being positioned to deviate the borehole.

The above objects and advantages of this invention may be more easily understood from the following detailed description when taken in conjunction with the attached drawings in which.

Figure 1:
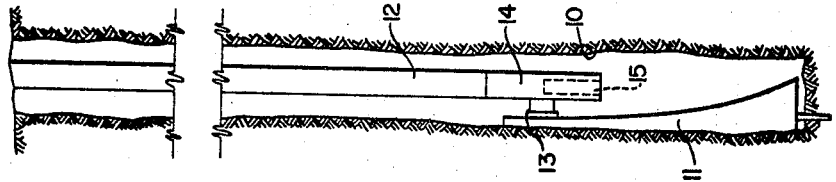
FIGURE 1 is an elevational view of a borehole showing the use of the invention in orienting and setting of a whipstock.

Referring now to FIGURE 1, there is shown an elevational view of borehole 10 having a drill string 12 suspended therein. Fastened to the lower end of the drill string is a whipstock 11 that is to be set in the borehole with a particular orientation to deviate the borehole in a desired direction. The whipstock 11 is connected to the lower end of the drill string 12 by means of a latch mechanism 13. The construction of the whipstock 11 and the latch mechanism is well known to those skilled in the art and forms no part of this invention. Attached to the lower portion of the drill string 12 is an instrument stub or housing 14. The instrument stub or housing contains a detecting apparatus 15 constructed according to this invention.

When it is desired to install the whipstock 11, the drill string with the whipstock attached to its lower end is lowered into the borehole and its orientation determined by means of the detector 15. When the whipstock is properly oriented, it may be embedded in the formation and the latch mechanism 13 tripped. The drill string 12 and instrument stub 14 can then be withdrawn from the borehole.

Figure 2:
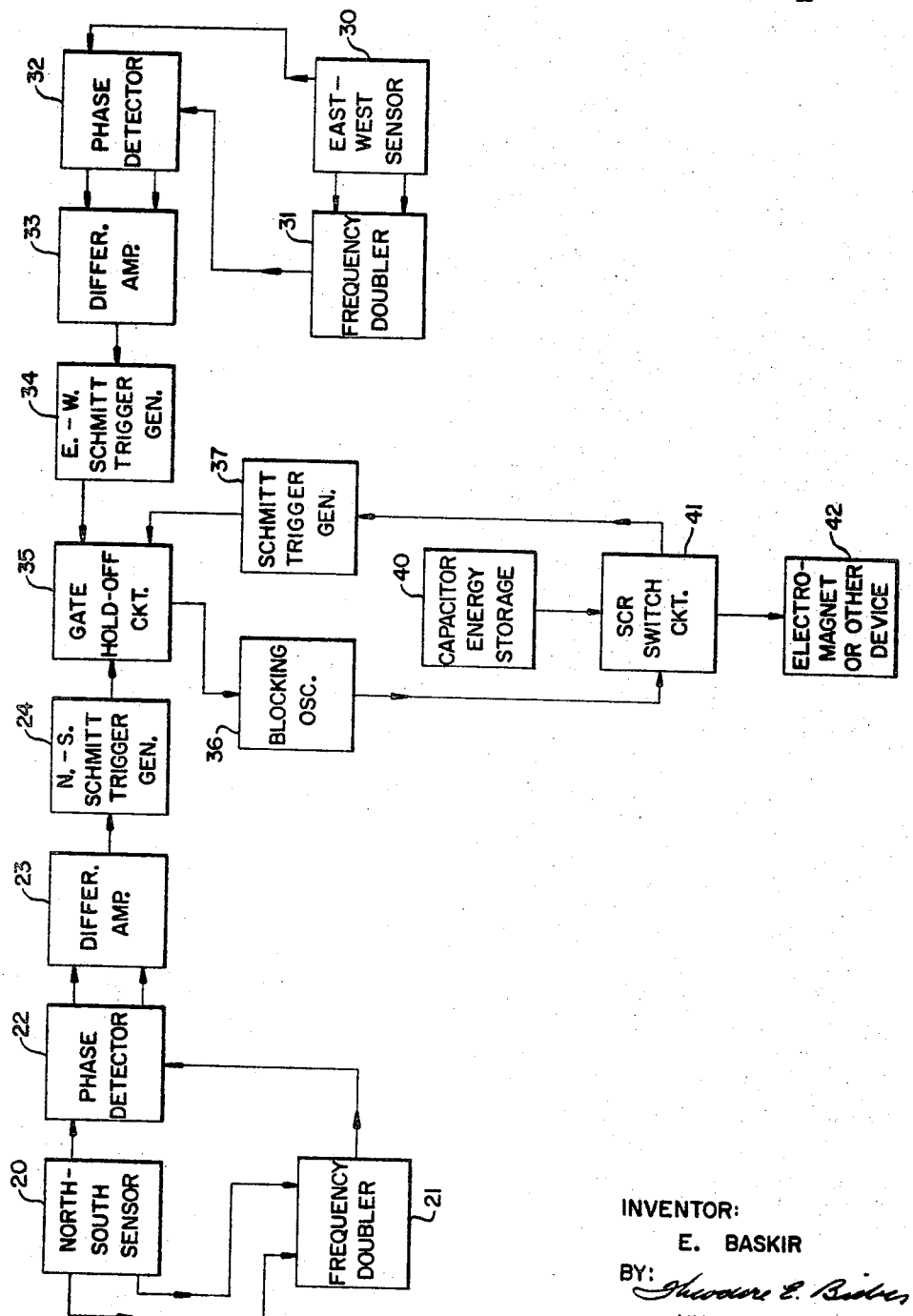
FIGURE 2 is a block diagram of the electronic circuitry of the invention.

The detailed construction of the detecting instrument 15 is shown in FIGURE 2. The instrument uses a north-south or first sensor 20 that is preferably a saturable core reactor having signal windings disposed thereon. The signal from the north-south sensor is supplied to both a phase sensitive detector 22 and a frequency doubling circuit 21. The phase sensitive detector 22 determines the difference between the signal induced in the signal windings on the saturable core reactor and a reference signal derived from the exciting AC of the sensor. The signal from the phase sensitive detector which represents the algebraic phase difference between the signals is then supplied to the difference amplifier 23. The output signal from the difference amplifier is supplied to a Schmitt trigger circuit 24 that converts the difference signal to a series of pulses. More particularly, the Schmitt trigger circuit 24 should be adjusted so that it supplies a single pulse whenever the signal from the difference amplifier reaches a substantially zero value, that is, whenever the sensitive axis of the north-south sensor is directed north or south.

Also shown in FIGURE 2 is an east-west or second sensor 30. The east-west sensor is also preferably a saturable core reactor having a pair of signal windings disposed thereon. In addition, the sensitive axis of the east-west sensor is disposed approximately 90 degrees from the sensitive axis of the north-south sensor 20 and rigidly attached to it. The two sensors 20 and 30 are rotated in unison in an assumed counterclockwise direction when viewed from above in the following description. Of course, they could also rotate in a clockwise direction if desired. The signal from the east-west sensor is supplied to a frequency doubler 31 and phase sensitive detector 32. The phase sensitive detector 32 in turn is coupled to a difference amplifier 33 whose output is supplied to a Schmitt trigger circuit 34. The trigger circuit 34 is designed to supply a pulse having a width substantially equal to the time required for the sensitive axis of the east-west sensor to pass through the two north quadrants and a similar width pulse of opposite sign and reduced amplitude when the east-west sensor passes through the south quadrants. This result can be achieved by utilizing the output signal from the difference amplifier to trip the Schmitt trigger circuit as the signal increases above a preset level in a positive direction. The positive polarity should correspond to the signal derived as the sensitive axis of the east-west sensor passes through the north quadrant.

The outputs of the respective field responsive devices 20 to 24 and 30 to 34 described above are then supplied to switching means now to be described whereby the east-west trigger signal is effective to discriminate between the north-south pulses associated respectively with the north and the south pointing of a vector fixed in the rotary assembly along the sensitive axis of the north-south sensor.

Both the Schmitt trigger circuit 24 and Schmitt trigger circuit 34 are coupled to a gate hold-off circuit 35. The gate hold-off circuit is designed to open only when it receives the pulse from the Schmitt trigger circuit 34. When the gate hold-off circuit 35 opens, it will pass the signal from the Schmitt trigger circuit 24. The gate hold-off circuit 35 is designed to pass a signal only when it is held open by a signal from the trigger circuit 34. The gate hold-off circuit 35 is coupled to a blocking oscillator 36 that is actuated only when gate hold-off circuit 35 passes a trigger pulse from Schmitt trigger circuit 24. The gate hold-off circuit 35 may also be designed to block the passage of pulses from the Schmitt trigger circuit 24 unless an additional enabling signal, such as that from the Schmitt trigger 37, is present simultaneously. The purpose of the Schmitt trigger 37 in certain applications will be explained more fully below, but it is not essential to this invention. In this embodiment, the blocking oscillator 36 is coupled to a silicon controlled rectifier switch circuit 41 that is coupled to a large storage capacitor 40. Thus, when the gate hold-off circuit 35 passes a pulse from the Schmitt trigger circuit 24, the switch circuit 41 will be closed, and the capacitor wil be discharged to an electromagnet or other device to actuate other equipment. For example, the discharge of the capacitor could be used to actuate the firing mechanism of a string of perforating charges to perforate a well casing in a preferred direction. Similarly, the discharge of the capacitor could be used to release the latching mechanism 13 shown in FIGURE 1.

In this embodiment, the switch circuit 41 is also coupled to a Schmitt trigger circuit 37 which in turn is coupled to the gate hold-off circuit 35. The signal from the Schmitt trigger 37 provides an enabling gate signal to the gate hold-off circuit 35 thus insuring that a signal will be passed to the switch circuit 41 only when the capacitor 40 is completely charged. With the exception of the north-south sensor 20, the frequency doubling circuit 21, the phase detector 22, the east-west sensor 30, the frequency doubler 31 and the phase detector 32, the detecting instrument described herein makes use of electronic circuits well known to those skilled in the art. The north-south sensor 20, the frequency doubling circuit 21 and phase sensitive detector 22 will be described more particularly below.

Figure 3:
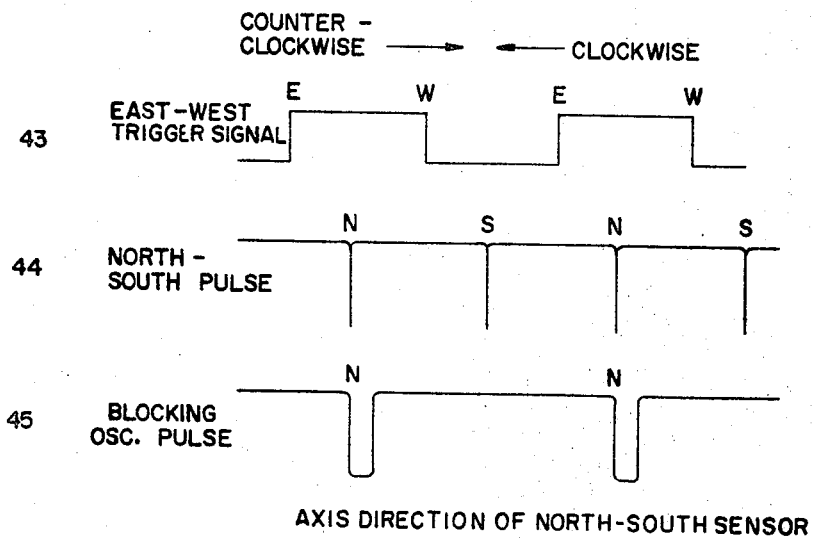
FIGURE 3 is a series of wave forms for the signals that are generated by the circuit shown in FIGURE 2.

Referring now to FIGURE 3, the operation of the circuit shown in FIGURE 2 will be explained. The wave form 43 illustrates the gate signal supplied by the Schmitt trigger 34. Positioned at the bottom of FIGURE 3 are a series of diagrams illustrating in plan view the alignment of the sensitive axis of the north-south sensor 20 with respect to the direction of magnetic north denoted by the arrow N. These plan views correspond to the particular wave forms shown above. Two complete rotations of the instrument are illustrated. As seen in FIGURE 3, the east-west trigger signal rises rapidly to a steady maximum as shown when the reference direction of the north-south sensor is aligned to the east. The signal from the Schmitt trigger 34 maintains its constant amplitude until the sensitive axis of the north-south sensor is aligned in a west direction when it then decreases to its initial value and remains at this value until the reference direction is again arranged as shown at 30c. This trigger signal is used to open the gate in the gate hold-off circuit 35 during the interval that the sensitive axis of the north-south sensor is traversing the two northern quadrants. The wave form 44 illustrates the pulse obtained from the north-south trigger when the sensitive axis of the north-south sensor comes into alignment with the north and south directions. It is seen that the north-south trigger provides a single pulse whenever the sensitive axis of the north-south sensor comes into alignment either with magnetic north or south.

The pulses of the wave form 44 that occur when the sensitive axis of the north-south sensor is disposed in a magnetic north direction are passed through the gate hold-off circuit 35 while the pulses resulting from alignment with magnetic south are blocked. The north pulses are passed through the blocking oscillator 36 which produces a wave form as shown in 45. The pulse of the blocking oscillator has a short time duration with the initial rise of the pulse coinciding with the occurrences of the north pulses. The pulse from the blocking oscillator can be used to operate the switch circuit 41 or trigger other equipment as pointed out above.

Figure 5A:
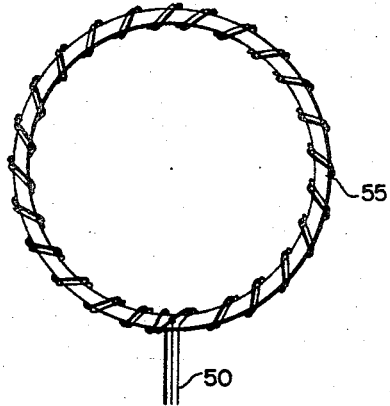
FIGURES 5a and 5b are plan views of one of the saturable reactors used in the sensors shown in FIGURE 2.
Figure 4:
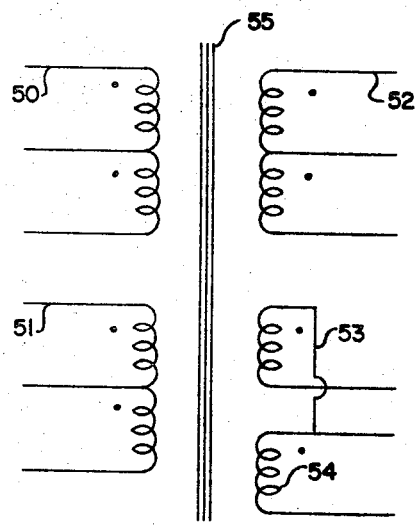
FIGURE 4 is a schematic drawing of the cores of one of the reactors used in the sensors shown in FIGURE 2.
Figure 5B:
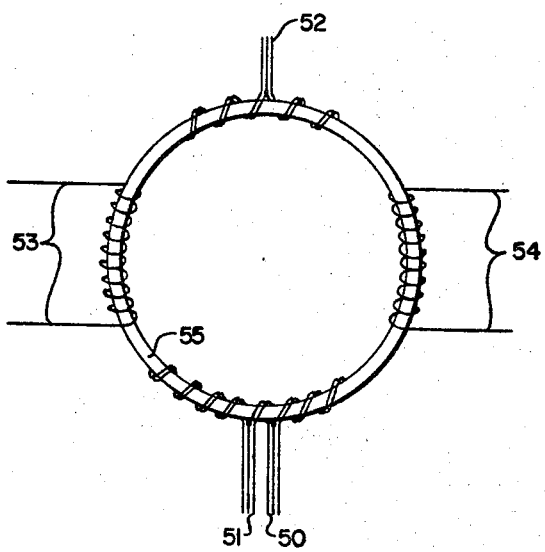

Referring now to FIGURES 4, 5a and 5b, there is shown the construction of the north-south sensor 20 shown in FIGURE 2. The east-west sensor is constructed in substantially the same manner. In FIGURE 4 there is shown schematically three center tapped windings 50, 51 and 52 disposed about a toroidal saturable reactor 55. Each of these windings is wound completely and uniformly about the core 55. FIGURE 5a illustrates one such winding on the core 55. The core 55 consists of a toroidal core of saturable ferromagnetic alloy such as Permalloy or Hymu 80 alloy. Excellent results have been obtained using toroids of less than half an inch in diameter and containing 10 to 20 wraps of 0.000125 inch thick Permalloy tape. Using toroids of this size, the center tapped windings 50, 51 and 52 should have approximately 40, 20 and 60 turns, respectively, No. 34 size wire. Also disposed on the toroidal core 55 are two signal windings 53 and 54 which have an equal number of turns, approximately 30 turns of 34 size wire, and each is wound on a 90° sector of the toroid as shown in FIGURE 5b. The two signal windings are connectd in series opposition as shown schematically in FIGURE 4. It should be noted that the circuit convention adopted in FIGURE 4 is that the dots indicate the positive terminal of the various windings.

Figure 6:
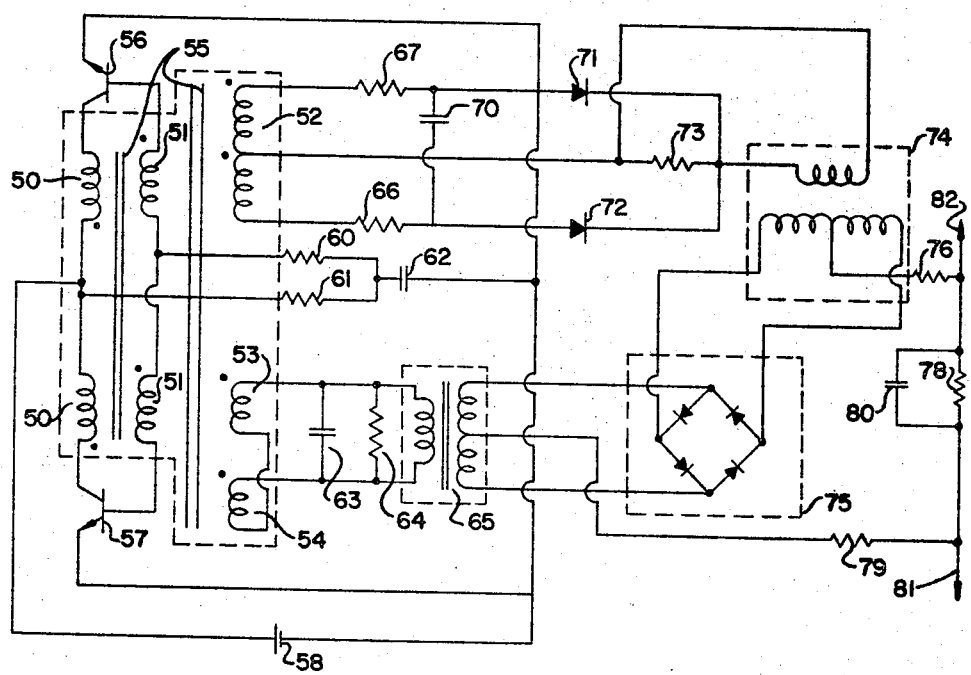
FIGURE 6 is a schematic drawing of the circuit of of the detector shown in FIGURE 2.

Referring now to FIGURE 6, there is shown the connection of the toroidal saturable core reactor and its associated windings in the oscillator and phase discriminating circuits of the north-south sensor 20. The windings on the toroidal core 55 provide a feedback for the self-excited oscillator shown in FIGURE 6 which in turn drives the core 55 to saturation. In the absence of a uniform external magnetic field, no voltage will be induced in the series opposed signal windings 53 and 54 when the core is driven to saturation. If an external uniform magnetic field does exist around the core and if this field has a component along the sensitive axis of the toroidal core 55, then the magnetic field induced in the toroid by current flowing in winding 50 will be aided in half of the core by the external field and will be opposed in the other half of the core by the external field. Therefore, one half of the core will saturate before the other and come out of saturation after the other, and induce in the signal windings 53 and 54 a net voltage containing even harmonics of the fundamental frequency of oscillation. The magnitude and phase of these harmonics and in particular the magnitude and phase of the second harmonic of the induced signal depends upon the magnitude and direction of the external uniform magnetic field. From the above, it is readily appreciated that the phase of the signal induced in the windings 53 and 54 with relation to the phase of the exciting voltage is an indication of the sense of direction of the external magnetic field component along the sensitive axis of the sensor.

The self-excited oscillator consists of two transistors 56 and 57 whose collectors are in circuit with the windings 50 while their bases are in circuit with the windings 51. The windings 50 and 51 are, of course, inductively coupled to each other through the toroidal core 55. In addition, the signal inductively induced in the windings 51 should be adjusted in phase to produce a regenerative oscillation in the two transistors 56 and 57. The circuit for the two transistors 56 and 57 is completed by the battery 58 whose negative side is connected to the emitters of the two transistors and whose positive side is connected to the center tap on the driving windings 50.

The two signal windings 53 and 54 are inductively coupled to the driving windings by means of the toroidal core 55. As explained above, the two signal windings 53 and 54 are connected in series opposition so that in the absence of an external magnetic field component along the sensitive axis of the toroidal core 55 no signal will be produced across the signal windings. When the external magnetic field is applied along the sensitive axis even harmonics of the signal induced in the driving windings 50 will be induced in the signal windings 53 and 54. The capacitor 62 is used to pass the common-mode AC voltage to ground while the resistance 60 limits the common-mode AC base current in the transistors 56 and 57.

A capacitor 63 is disposed in a shunt arrangement across the two signal windings 53 and 54 and adjusted to cause the signal windings to resonate at the second harmonic of the frequency of oscillation of the driving coils 50. This capacitor 63 significantly enhances the sensitivity of the two signal windings 53 and 54 to changes in the external magnetic field. In some cases it may be necessary to include a resistance 64 to supply a load to insure that current circulation in the signal windings remains below the threshold of second harmonic regeneration.

A transformer 65 is provided for inductively coupling the voltage induced in the signal windings 53 and 54 to two opposite corners of a bridge detecting circuit 75, which acts as the phase detector 22. The bridge detecting circuit 75 consists of four diodes disposed in a full wave rectifying configuration. The remaining two corners on the bridge detecting circuit 75 are driven by the signal received from a transformer 74 that supplies an even harmonic reference signal. The even harmonic reference signal is obtained from the reference windings 52 by means of the harmonic generating diodes 71 and 72. The two resistors 66 and 67 and the capacitor 70 form a low pass filter circuit that is disposed in a shunt arrangement with the reference windings 52 and whose values are chosen such as to pass the first harmonic of the signal obtained from windings 52. A resistor 73 disposed in the shunt arrangement across the primary of the transformer 74 serves to limit the amplitude of the first harmonic signal. Reference windings 52, resistors 66, 67 and 73, capacitor 70, diodes 71, 72 and transformer 74 comprise the frequency doubler circuit 21 shown in FIGURE 2.

The current from the two center tapped transformers 65 and 74 is passed through a low pass filtering network composed of resistances 76, 78 and 79 and capacitor 80. The current flow through the low pass filter network produces a DC voltage across the leads 81 and 82 which are in turn connected to the difference amplifier 23 shown in FIGURE 2. Over a limited range of frequencies, including all frequencies of practical interest, the magnitude of the DC voltage between the leads 81 and 82 will be proportional to the component of the uniform magnitude field that is parallel to the sensitive axis of the saturable toroidal coil. The DC voltage will have a zero value when the field component is zero and will reverse sign when the field component reverses direction.

When the above system is operated, the complete system including the north-south sensor 20 and the east-west sensor 30 is enclosed in a non-magnetic pressure vessel and lowered into the borehole. In the presence of the magnetic field of the earth the device will generate a pulsed signal each time the reference direction of the north-south sensor is aligned in the direction of the magnetic north.

The device, when rotated, will develop the signal shown in FIGURE 3. The switch circuit 41 will discharge the capacitor 40 whenever the reference direction of the north-south sensor 20 is aligned with magnetic north. As explained above, the closing of the switch which discharges the capacitor can be used to trigger other equipment. Likewise, the discharge of the capacitor could be transmitted to the surface to provide a large amplitude pulse indicating the instant at which the reference direction on the north-south sensor 20 is aligned in the direction of magnetic north.

The above system may be modified depending upon the information that is desired. For example, the complete signal from both the north-south sensor 20 and the east-west sensor 30 could be transmitted to the surface. Then by proper circuitry one could determine the exact magnetic direction of the downhole instrument. As pointed out above, even at rest the saturable core reactor provides a signal that is related to the component of the magnetic field along its sensitive axis. Of course, to provide a tool that will measure the magnetic north when the tool is stationary, it would be necessary to transmit complete signals to the surface or to a downhole measuring system. The system shown above in FIGURE 2 is designed primarily to sense the direction of magnetic north and actuate other equipment in correlation with magnetic north direction.

I claim as my invention:

1. A system for detecting magnetic north in a borehole comprising:

two devices responsive to a magnetic field, said devices each having a sensitive axis, the first of said devices being responsive to a null in the magnetic field component parallel to its sensitive axis to provide a pulse signal, the second of said devices being responsive in one manner to a magnetic field having a component directed in one sense substantially along a reference direction parallel to its sensitive axis and responsive in another manner when the direction of said magnetic field is reversed;

a mounting structure, said devices comprising respective field sensors mounted on said mounting structure with their sensitive axes displaced substantially 90°;

rotation means, said rotation means being coupled to said mounting structure to rotate said mounting structure about an axis substantially perpendicular to the sensitive axes of the sensors;

a switching means, the second of said devices being coupled to said switching means to close said switching means when the magnetic field has a component directed in one sense along the sensitive axis of said second device and to open said switching means otherwise;

an indicating means, said first device being coupled to said switching means and said switching means being coupled to said indicating means to indicate the signal of said first device when said switching means is closed.

2. The system of claim 1 wherein:

one of said sensors comprises a toroidal core of saturable ferromagnetic alloy having at least five windings, one of said windings being evenly distributed around said core and connected to the input side of an oscillator, a second of said windings being evenly distributed around said core and connected to the output side of said oscillator whereby said toroidal core will be driven to saturation, a third and fourth of said windings being disposed respectively over opposite segments of said core, connected in series opposition and tuned by means of a capacitor to the frequency of the second harmonic of the frequency of oscillation of said oscillator, a fifth of said windings being evenly distributed around said core and connected to a circuit which produces substantially even harmonics of the frequency of oscillation of said oscillator;

and in addition to said core and said windings, said device also comprising a phase sensitive detector in which the phase of the signal from said third and fourth windings is compared in phase with the signal of said fifth winding and said even harmonic generating circuit.

References Cited

UNITED STATES PATENTS 3,288,210   11/1966   Bryant _____ 33—205 X

FOREIGN PATENTS 778,160   7/1957   Great Britain.
373,264   7/1939   Italy.

ROBERT B. HULL, *Primary Examiner.*